United States Patent
Murayama et al.

(10) Patent No.: US 7,956,497 B2
(45) Date of Patent: Jun. 7, 2011

(54) ELECTRET DEVICE AND ELECTROSTATIC INDUCTION CONVERSION APPARATUS COMPRISING THE SAME

(75) Inventors: Yoshiki Murayama, Anpachi-gun (JP); Naoteru Matsubara, Ichinomiya (JP); Katsuji Mabuchi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 766 days.

(21) Appl. No.: 11/864,488

(22) Filed: Sep. 28, 2007

(65) Prior Publication Data
US 2008/0258565 A1    Oct. 23, 2008

(30) Foreign Application Priority Data

Sep. 29, 2006  (JP) .................. 2006-267270
Mar. 20, 2007  (JP) .................. 2007-072872
Sep. 3, 2007   (JP) .................. 2007-227457

(51) Int. Cl.
*G11C 13/02* (2006.01)
(52) U.S. Cl. ....................................... 307/400
(58) Field of Classification Search ........... 307/400
See application file for complete search history.

(56) References Cited

U.S. PATENT DOCUMENTS

| | | | |
|---|---|---|---|
| 6,627,563 B1 * | 9/2003 | Huberty | 442/91 |
| 7,449,811 B2 | 11/2008 | Suzuki et al. | |
| 7,661,794 B2 * | 2/2010 | Hano et al. | 347/54 |
| 2006/0046500 A1 * | 3/2006 | Miyamoto | 438/749 |
| 2006/0113862 A1 * | 6/2006 | Suzuki et al. | 310/309 |
| 2006/0188728 A1 | 8/2006 | Kawato et al. | |
| 2009/0051242 A1 | 2/2009 | Suzuki et al. | |

FOREIGN PATENT DOCUMENTS

| | | |
|---|---|---|
| JP | 9283373 A | 10/1997 |
| JP | 2005-151026 | 6/2005 |
| JP | 2005-529574 | 9/2005 |
| JP | 2006180450 A | 7/2006 |
| WO | WO 03/105167 A2 | 12/2003 |

OTHER PUBLICATIONS

Japanese Office Action for corresponding Patent Application No. JP 2007-227457, dated Aug. 18, 2009, pp. 1-5, Japan.
Japanese Office Action for corresponding JP Application No. 2007-227457, Apr. 14, 2009, Japan.

* cited by examiner

*Primary Examiner* — Jared J Fureman
*Assistant Examiner* — Dru M Parries
(74) *Attorney, Agent, or Firm* — Ditthavong Mori & Steiner, P.C.

(57) ABSTRACT

An electret device includes an electret film into which charges are injected and a barrier film provided on a surface of the electret film and having an electron affinity smaller than the electron affinity of the electret film.

12 Claims, 8 Drawing Sheets

○ SAMPLE 12 (ELECTRET FILM (SiO2) + BARRIER FILM (MSQ) (CONTACT ANGLE: 45 DEGREES))
× SAMPLE 13 (ELECTRET FILM (SiO2) + BARRIER FILM (SiOC))
△ SAMPLE 14 (ELECTRET FILM (SiO2) (CONTACT ANGLE: 31 DEGREES))

○ SAMPLE 15 (ELECTRET FILM (TEOS) + BARRIER FILM (MSQ))
△ SAMPLE 16 (ELECTRET FILM (TEOS))

| TIME [h] | WITH MSQ FILM | WITH NO MSQ FILM |
|---|---|---|
| 0.10 | 100% | 100% |
| 0.17 | 89% | 93% |
| 0.50 | 88% | 92% |
| 6.0 | 69% | 56% |
| 22.0 | 64% | 9% |
| 72.0 | 61% | 2% |

| RELATIVE HUMIDITY [h] | WITH MSQ FILM | WITH NO MSQ FILM |
|---|---|---|
| 10 | 86% | 86% |
| 35 | 79% | 59% |
| 80 | 79% | 4% |

…

ELECTRET DEVICE AND ELECTROSTATIC INDUCTION CONVERSION APPARATUS COMPRISING THE SAME

CROSS-REFERENCE TO RELATED APPLICATIONS

The first priority application number JP2006-267270, Electret Device and Electrostatic Induction Conversion Apparatus Comprising the Same, Sep. 29, 2006, Naoteru Matsubara, Yoshiki Murayama, Katsuji Mabuchi, the second priority application number JP2007-72872, Electret Device and Electrostatic Induction Conversion Apparatus Comprising the Same, Mar. 20, 2007, Yoshiki Murayama, Naoteru Matsubara, Katsuji Mabuchi, and the third priority application number JP2007-227457, Electret Device and Electrostatic Induction Conversion Apparatus Comprising the Same, Sep. 3, 2007, Yoshiki Murayama, Naoteru Matsubara, Katsuji Mabuchi, upon which this patent application is based are hereby incorporated by reference.

BACKGROUND OF THE INVENTION

1. Field of the Invention

The present invention relates to an electret device and an electrostatic induction conversion apparatus comprising the same.

2. Description of the Background Art

An electrostatic induction generator comprising an electret film is known in general. This electrostatic induction generator comprising the electret film is constituted by a movable electrode, a fixed electrode and the electret film as a charge retaining material made of a resin material such as Teflon (registered trademark) formed on the fixed electrode. The electrostatic induction generator is constituted such that the quantity of charges of the movable electrode induced with charges stored in the electret film due to vibration of the movable electrode is changed and the changed charges are outputted (generated) as a current.

SUMMARY OF THE INVENTION

An electret device according to a first aspect of the present invention comprises an electret film into which charges are injected and a barrier film provided on a surface of the electret film and having an electron affinity smaller than the electron affinity of the electret film. The electron affinity is energy difference between a bottom of a conduction band and a vacuum level.

An electret device according to a second aspect of the present invention comprises an electret film into which charges are injected and a barrier film provided on a surface of the electret film and containing an organic component.

An electrostatic induction conversion apparatus according to a third aspect of the present invention comprises an electret device including an electret film into which charges are injected and a barrier film provided on a surface of the electret film and having an organic component.

An electrostatic induction conversion apparatus according to a fourth aspect of the present invention comprises an electret device including an electret film into which charges are injected and a barrier film provided on a surface of the electret film and having an electron affinity smaller than the electron affinity of the electret film.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be hereinafter described with reference to the drawings.

First Embodiment

A structure of an electret device 100 according to a first embodiment of the present invention will be described with reference to FIGS. 1 to 3.

Figure 1:
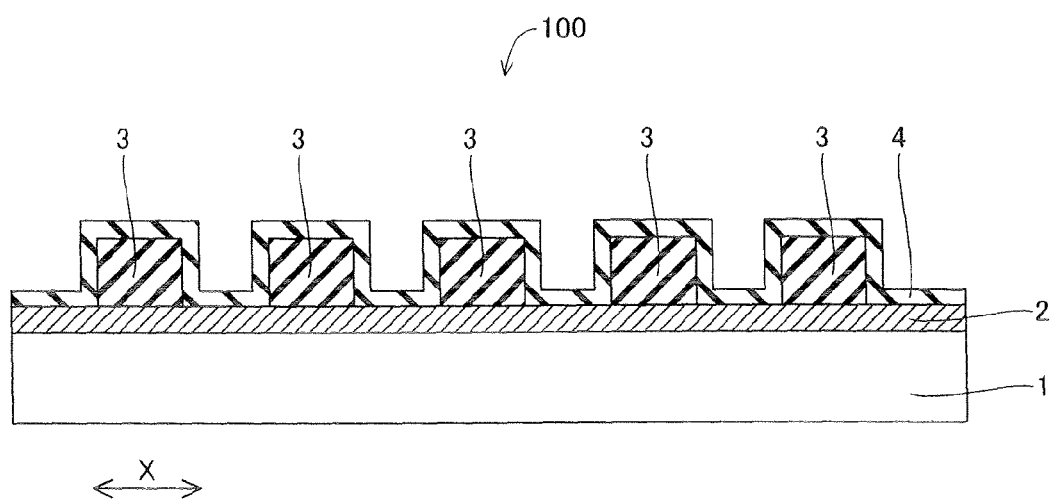
FIG. 1 is a sectional view showing a structure of an electret device according to a first embodiment of the present invention.
Figure 2:
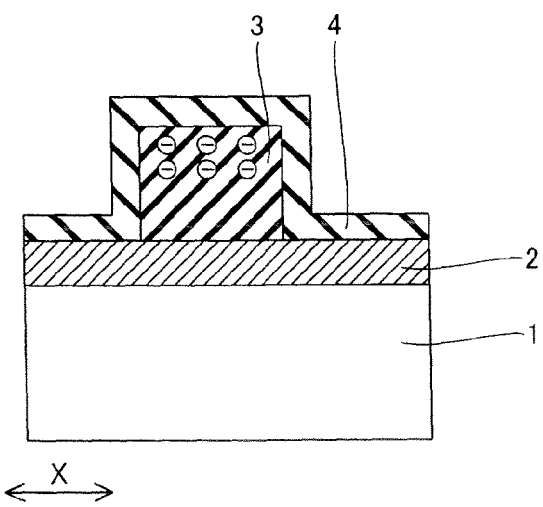
FIG. 2 is an enlarged sectional view showing the structure of the electret device according to the first embodiment shown in FIG. 1.

In the electret device 100 according to the first embodiment of the present invention, an electrode 2 is formed on a surface of the silicon substrate 1 as shown in FIG. 1. This silicon substrate 1 has a thickness of about 0.1 mm to about 1 mm. The electrode 2 has a thickness of about 1 μm to about 200 μm, and is formed by being doped with phosphorus (P) by thermal diffusion.

According to the first embodiment, a plurality of electret films 3 are formed on a surface of the electrode 2 at prescribed intervals in a direction X. The electret films 3 each have a thickness of about 0.1 μm to about 20 μm and consist of $SiO_2$ formed by thermal oxidation. An impurity consisting of phosphorus (P) or boron (B) is added to the electret films 3. Each electret film 3 stores injected charges as shown in FIG. 2. More specifically, in a forbidden band of each electret film 3, a trap level which stores electrons is formed due to dangling bonds, an impurity, defects, an interface and the like as shown in FIG. 3.

According to the first embodiment, a barrier film 4 is so formed on the surface of the electrode 2 as to cover the electret films 3 as shown in FIG. 1. The barrier film 4 has a thickness of about 0.1 µm to about 20 µl and consists of MSQ (methyl silses quioxane) or SiOC.

Figure 3:
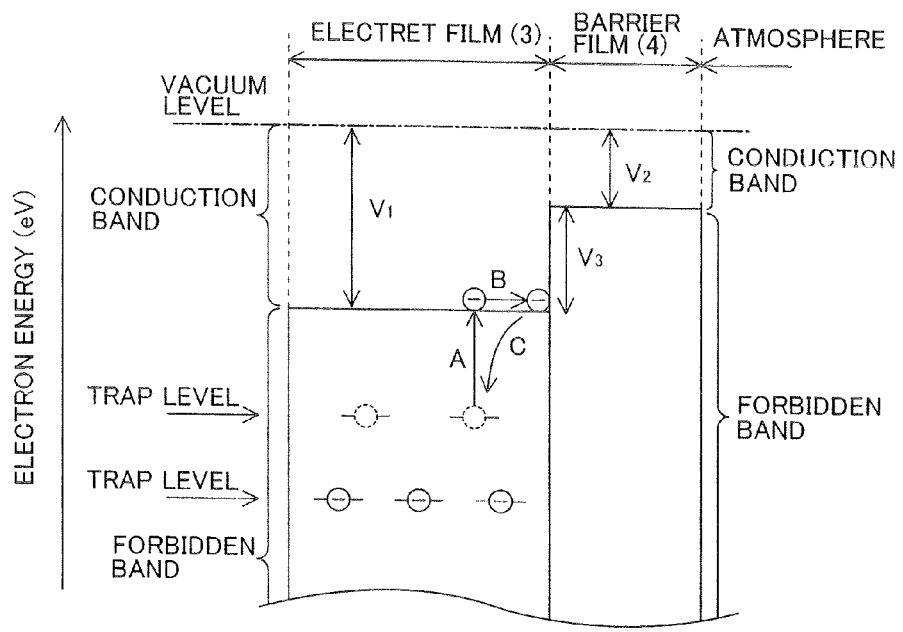
FIG. 3 is a diagram showing an energy band of a conductive band of the electret device according to the first embodiment shown in FIG. 1.

According to the first embodiment, the barrier film 4 of MSQ or SiOC has an electron affinity $V_2$ smaller than an electron affinity $V_1$ of each electret film 3 consisting of $SiO_2$ as shown in FIG. 3. The electron affinity is energy difference between a bottom of a conduction band and a vacuum level. Thus, an energy barrier $V_3$ is formed between the electret films 3 and the atmosphere by difference between the electron affinity $V_1$ of each electret film 3 and the electron affinity $V_2$ of the barrier film 4.

The electret device 100 is constituted by the electret films 3 and the barrier film 4.

A manufacturing process of the electret device 100 according to the first embodiment of the present invention will be now described with reference to FIG. 1.

As shown in FIG. 1, the electrode 2 is formed on the surface of the silicon substrate 1 by being doped with phosphorus (P) by thermal diffusion. This electrode 2 is formed by thermal diffusion under a temperature of 900° C. for 90 minutes. A silicon oxide film is formed on the surface of the electrode 2 under a temperature condition of 1100° C. by thermal oxidation. Then phosphorus (P) or boron (B) is ion-implanted into the silicon oxide film. Thereafter the silicon oxide film is patterned by photolithography or RIE (reactive ion etching), thereby forming the electret films 3.

The barrier film 4 is so formed on the surface of the electrode 2 as to cover the electret films 3. In the case of forming the barrier film 4 of MSQ, an alcoholic solution melted with a silicon compound consisting of $CH_3Si(OH)_3$ is dropped on the surfaces of the electret films 3 and the electrode 2. Isopropyl alcohol (IPA) and acetone are employed as the alcoholic solution, for example.

The silicon substrate 1 is rotated at a rotational speed of 5500 rpm for about 20 seconds. Thus, a coating is formed on the surfaces of the electret films 3 and the electrode 2. Heat treatment is performed in a nitrogen atmosphere at a temperature of 100° C. for one minute, at a temperature of 150° C. for one minute, at a temperature of 200° C. for one minute and at a temperature of 22° C. for one minute, thereby evaporating alcohol. Thereafter heat treatment is performed at a temperature of about 400° C. for 30 minutes, thereby forming the barrier film 4 consisting of MSQ.

In a case of forming the barrier film 4 consisting of SiOC, the barrier film 4 consisting of SiOC is formed by PE-CVD (plasma enhanced chemical vapor deposition). SiOC is formed by PE-CVD under a pressure of 532 Pa, a substrate temperature of 350° C. with source gas of trimethylsilane (TMS) and $O_2$ at high-frequency (RF) power of 600 W, for example.

Finally, the temperature of the silicon substrate 1 is set to 80° C., and electrons are injected into the electret films 3 by corona discharge. Thus, the electret device 100 shown in FIG. 1 is formed.

According to the first embodiment, as hereinabove described, the barrier film 4 having the electron affinity $V_2$ smaller than the electron affinity $V_1$ of each electret film 3 is provided on the surfaces of the electret films 3, whereby the energy barrier $V_3$ can be formed between the electret films 3 and the atmosphere by difference between the electron affinity $V_1$ of each electret film 3 and the electron affinity $V_2$ of the barrier film 4. Therefore, in a case where electrons captured in the shallow trap level of each electret film 3 are exited to the conduction band (along arrow A in FIG. 3) due to external energy such as heat or light, the exited free electrons return to the original trap level (along arrows B and C in FIG. 3) without being discharged into the atmosphere by the energy barrier $V_3$ and hence the electrons stored in the electret films 3 can be inhibited from reduction. Therefore, the surface potential of the electret device 100 can be inhibited from reduction.

According to the first embodiment, the impurity consisting of phosphorus (P) or boron (B) is added to the electret films 3, whereby impurity level having a high density (trap level) can be formed in the forbidden band of each electret film 3 with the impurity consisting of phosphorus (P) or boron (B). Thus, electrons can be captured in the impurity level having a high density, and hence the quantity of charges stored in the electret films 3 can be improved.

An experiment conducted for confirming the aforementioned effect of the barrier film according to the first embodiment will be now described. In this experiment, the following samples 1 to 3 were prepared. More specifically, an electret device according to the sample 1 corresponding to the aforementioned first embodiment, constituted by forming a barrier film of MSQ on surfaces of electret films of $SiO_2$, and an electret device according to the sample 2 corresponding to the aforementioned first embodiment, constituted by forming a barrier film of SiOC on surfaces of electret films of $SiO_2$ were prepared. The sample 3 according to a comparative example, constituted by an electret film of $SiO_2$ was prepared. The electret films of $SiO_2$ according to the samples 1 to 3 each have a thickness of 1 µm and were formed by thermal oxidation. The barrier film of MSQ according to the sample 1 has a thickness of 0.3 µm and was formed by spin coating. The barrier film of SiOC according to the sample 2 has a thickness of 0.3 µm and was formed by PE-CVD. Electrons are injected into the prepared samples 1 to 3, and the surface potentials of the samples 1 to 3 into which electrons are injected were measured. Results thereof are shown in FIG. 4.

Figure 4:
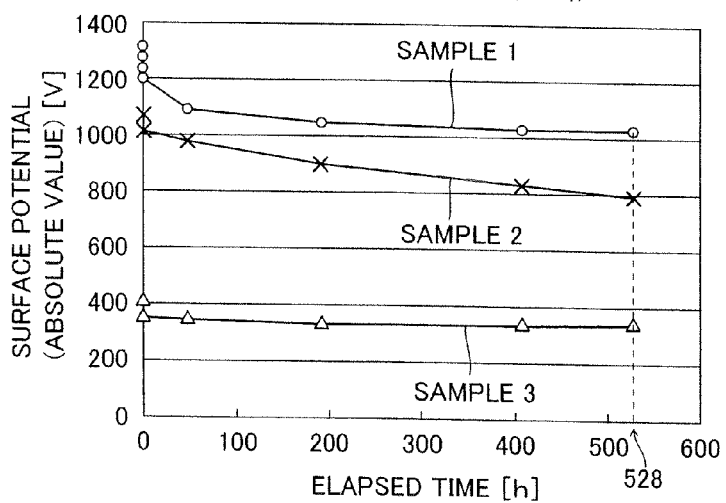
FIG. 4 is a graph showing the relation between surface potentials and elapsed time in samples 1 to 3.

From the measurement results shown in FIG. 4, after a lapse of 528 hours (22 days), the surface potential of the electret device according to the sample 1 corresponding to the aforementioned first embodiment, constituted by forming the barrier film of MSQ on the surfaces of the electret films of $SiO_2$ was about −1020 V. After a lapse of 528 hours (22 days), the surface potential of the electret device according to the sample 2 corresponding to the aforementioned first embodiment, constituted by forming the barrier film of SiOC on the surfaces of the electret films of $SiO_2$ was about −811 V. After a lapse of 528 hours (22 days), the surface potential of the sample 3 according to the comparative example, constituted by the electret film of $SiO_2$ was about −330 V.

It has been proved from the aforementioned measurement results that the surface potential of the electret device is increased by forming the barrier film on the surfaces of the electret films as in the samples 1 and 2. This is conceivably because energy barriers are formed between the electret films and the atmosphere with the barrier film having the electron affinity smaller than the electron affinity of each electret film and hence electrons injected into the electret films are inhibited from being discharged into the atmosphere.

An experiment conducted for confirming influence by the thickness of each electret film according to the aforementioned first embodiment will be now described. In this experiment, in order to confirm the influence by the thickness of each electret film, an electret device according to a sample 4 corresponding to the aforementioned first embodiment, constituted by forming a barrier film of MSQ on surfaces of electret films of $SiO_2$ having a thickness of 2.4 μl, a sample 5 according to a comparative example, constituted by an electret film of $SiO_2$ having a thickness of 2.4 μm were prepared. The samples 4 and 5 are similar to the aforementioned samples 1 and 3 except for the thicknessess of the electret films respectively. The surface potentials of the samples 4 and 5 were measured. Results thereof are shown in FIG. 5.

Figure 5:
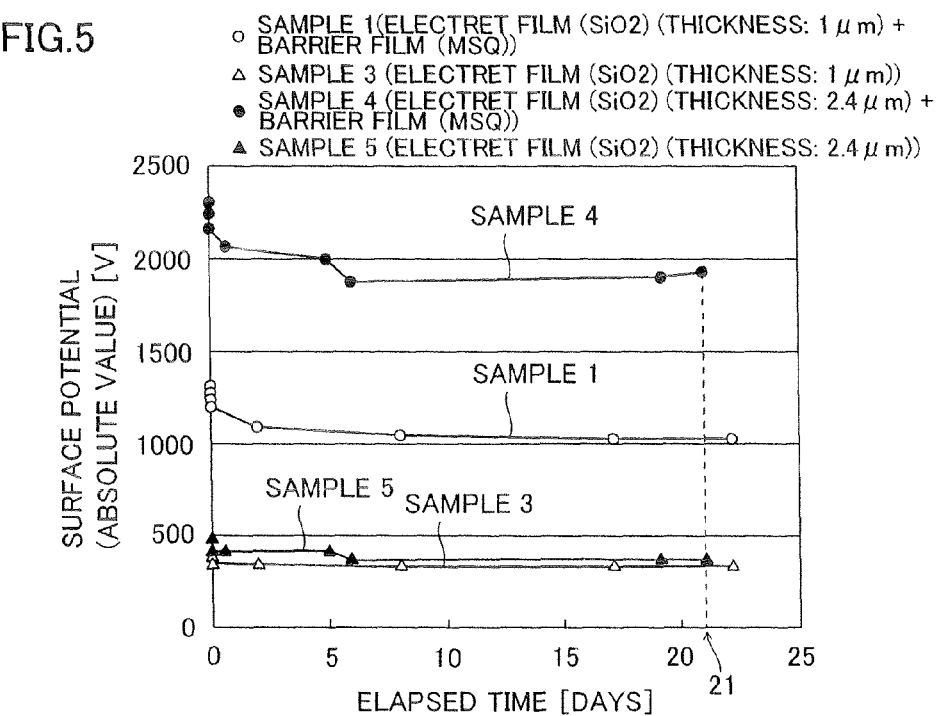
FIG. 5 is a graph showing the relation between surface potentials and elapsed time in samples 1, 3, 4 and 5.

From the measurement results shown in FIG. 5, after a lapse of 21 days, the surface potential of the electret device according to the sample 4 corresponding to the aforementioned first embodiment, constituted by forming the barrier film on the surfaces of the electret films each having a thickness of 2.4 μm was about −1917V. After a lapse of 21 days, the surface potential of the sample 5 according to the comparative example, constituted by the electret film having a thickness of 2.4 μm was about −354 V.

It has been proved from the aforementioned measurement results that increase in the thickness of the electret film remarkably increases the surface potential of the electret device as in the sample 4 in a case corresponding to the aforementioned first embodiment where the barrier film is formed on the surfaces of the electret films. On the other hand, it has been proved that the surface potential of the electret film is a little increased even when the thickness of the electret film is increased as in the sample 5 in the case of the sample according to the comparative example, constituted by the electret film. This is conceivably because the quantity of charges capable of being stored in each electret film are saturated with respect to the thickness of the electret film. Thus, it has been proved that the barrier film formed on the surfaces of the electret films can inhibit the quantity of charges capable of being stored in each electret film from being saturated with respect to the thickness of the electret film.

An experiment conducted for confirming the aforementioned effect of adding the impurity consisting of phosphorus (P) or boron (B) to the electret films according to the first embodiment will be now described. In this experiment, the following samples 6 to 11 were prepared. More specifically, an electret device according to the sample 6 corresponding to the aforementioned first embodiment, constituted by forming a barrier film on surfaces of electret films added with no impurity, an electret device according to the sample 7 corresponding to the aforementioned first embodiment, constituted by forming a barrier film on surfaces of electret films added with boron (B), and an electret device according to the sample 8 corresponding to the aforementioned first embodiment, constituted by forming a barrier film on surfaces of electret films added with phosphorus (P) were prepared. The sample 9 according to a comparative example, constituted by an electret film added with no impurity, the sample 10 according to a comparative example, constituted by an electret film added with boron (B), and the sample 11 according to a comparative example, constituted by an electret film added with phosphorus (P) were prepared. The electret films of the samples 6 to 11 each have a thickness of 1.5 μm and consist of $SiO_2$ formed by thermal oxidation. The barrier films of the samples 6 to 8 each have a thickness of about 0.3 μm and consist of MSQ formed by spin coating. Boron (B) was added to the electret films of the sample 7 and phosphorus (P) was added to the electret films of the sample 8 by ion-implanting at implantation energy of about 380 keV, an implantation dosage of about $2\times10^{13}$ ions/cm$^{-2}$. Boron (B) was added to the electret film of the sample 10 and phosphorus (P) was added to the electret film of the sample 11 by ion-implanting at implantation energy of about 120 keV, an implantation dosage of about $2\times10^{15}$ ions/cm-$^2$. Electrons are injected into the prepared samples 6 to 11, and the surface potentials of the samples 6 to 11 into which the electrons are injected were measured. Results thereof are shown in FIG. 6.

Figure 6:
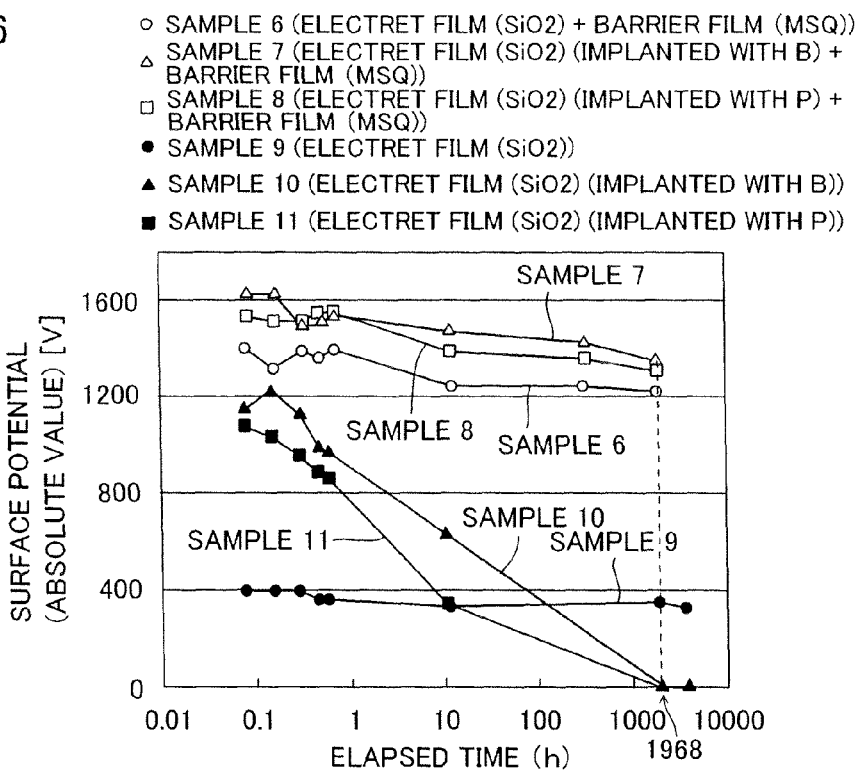
FIG. 6 is a graph showing the relation between surface potentials and elapsed time in samples 6 to 11.

From the measurement results shown in FIG. 6, after a lapse of 1968 hours (82 days), the surface potential of the electret device according to the sample 6 corresponding to the aforementioned first embodiment, constituted by forming the barrier film on the surfaces of the electret films added with no impurity was about −1208 V. After a lapse of 1968 hours (82 days), the surface potential of the electret device according to the sample 7 corresponding to the aforementioned first embodiment, constituted by forming the barrier film on the surfaces of the electret films added with boron (B) was about −1340 V. After a lapse of 1968 hours (82 days), the surface potential of the electret device according to the sample 8 corresponding to the aforementioned first embodiment, constituted by forming the barrier film on the surfaces of the electret films added with phosphorus (P) was about −1304V. After a lapse of 1968 hours (82 days), the surface potential of the sample 9 according to the comparative example, constituted by the electret film added with no impurity was about −335 V. After a lapse of 1968 hours (82 days), the surface potential of the sample 10 according to the comparative example, constituted by the electret film added with boron (B) was about −9 V. After a lapse of 1968 hours (82 days), the surface potential of the sample 11 according to the comparative example, constituted by the electret film added with phosphorus (P) was about 5 V (not shown).

In the case corresponding to the aforementioned first embodiment where the barrier film is formed on the surfaces of the electret films, it has been proved from the aforementioned measurement results that the surface potential of the electret device is increased by adding the impurity consisting of boron (B) or phosphorus (P) to the electret films as in the samples 7 and 8 as compared with the sample 6 added with no impurity. In the case of the comparative examples constituted by the electret films, on the other hand, it has been proved that when the impurity consisting of boron (B) or phosphorus (P) is added to the electret films as in the samples 10 and 11, the surface potential is reduced as compared with the sample 9 added with no impurity. This is conceivably because electrons injected through the impurity levels formed by adding the impurity to the electret film are discharged.

Second Embodiment

A structure of an electret device 200 according to a second embodiment, in which a barrier film 201 containing an organic component is formed, will be described with reference to FIG. 7.

Figure 7:
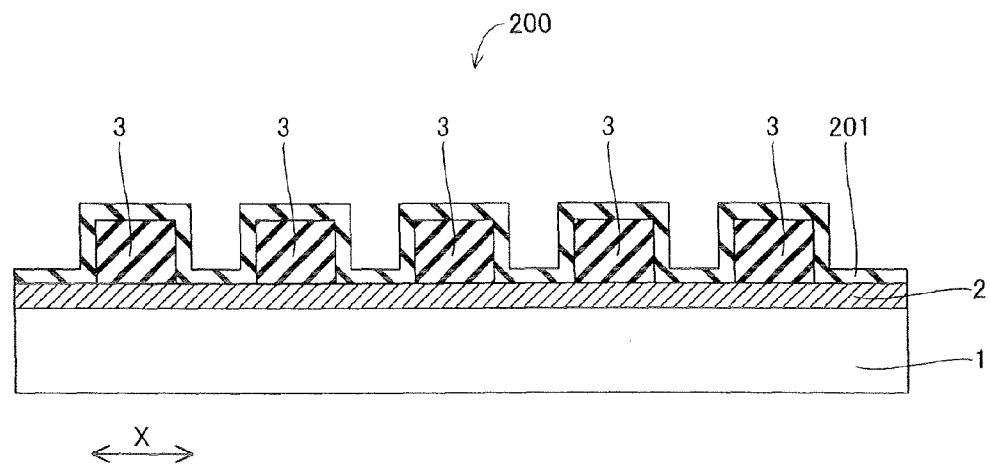
FIG. 7 is a sectional view showing a structure of an electret device according to a second embodiment of the present invention.

In the electret device 200 according to the second embodiment, the barrier film 201 is so formed on a surface of an electrode 2 as to cover electret films 3 as shown in FIG. 7. The barrier film 201 has a thickness of about 0.1 μm to about 20 μm and consists of MSQ or SiOC.

According to the second embodiment, the barrier film 201 consisting of MSQ or SiOC contains methyl groups as an organic component having hydrophobicity. More specifically, the barrier film 201 contains polysiloxane having methyl groups. Thus, a surface of the barrier film 201 has lower wettability as compared with surfaces of the electret films 3.

The electret device 200 is constituted by the electret films 3 and the barrier film 201.

The remaining structure of the second embodiment is similar to that of the aforementioned first embodiment.

The manufacturing process of the second embodiment is similar to that of the aforementioned first embodiment.

Figure 8:
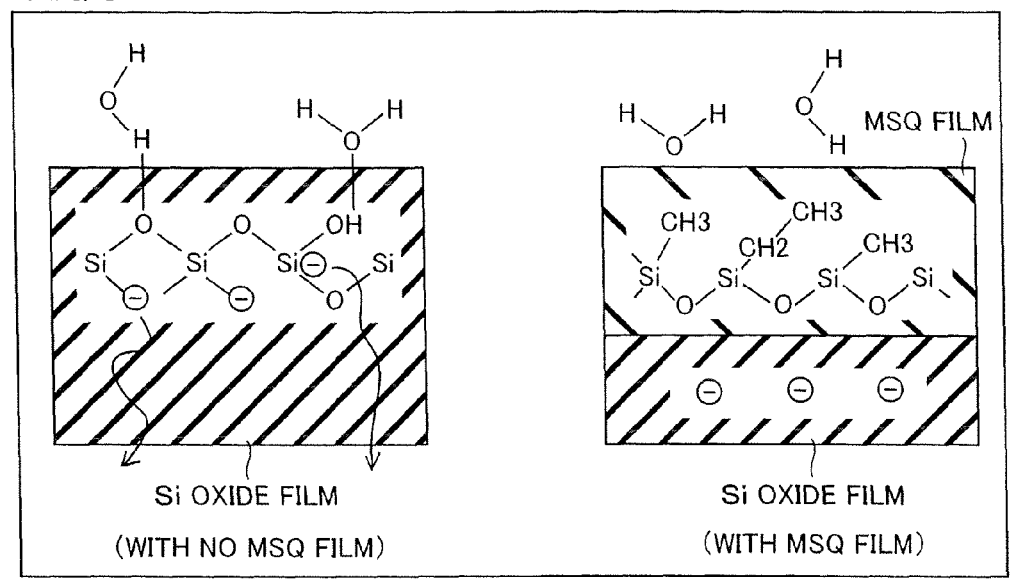
FIG. 8 is a diagram for illustrating effects obtained by forming a barrier film of the electret device according to the second embodiment of the present invention.

According to the second embodiment, as hereinabove described, the barrier film 4 containing methyl groups having hydrophobicity is provided on the surfaces of the electret films 3, whereby the barrier film 4 having hydrophobicity can inhibit the electret films 3 and moisture in the atmosphere from being in contact with each other (see FIG. 8). Thus, electrons stored in the electret films 3 can be inhibited from leaking into moisture in the atmosphere, and hence the electrons stored in the electret films 3 can be inhibited from reduction. Therefore, the surface potential of the electret device 200 can be inhibited from reduction.

The remaining effects of the second embodiment are similar to those of the aforementioned first embodiment.

An experiment conducted for confirming the aforementioned effect of the barrier film according to the second embodiment will be now described. In this experiment, the following samples 12 to 14 were prepared. More specifically, an electret device according to the sample 12 corresponding to the aforementioned second embodiment, constituted by forming a barrier film of MSQ on surfaces of electret films of $SiO_2$, and an electret device according to the sample 13 corresponding to the aforementioned second embodiment, constituted by forming a barrier film of SiOC on surfaces of electret films of $SiO_2$ were prepared. The sample 14 according to a comparative example, constituted by an electret film of $SiO_2$ was prepared. The electret films of $SiO_2$ according to the samples 12 to 14 each have a thickness of 1 μm and were formed by thermal oxidation. The barrier film of MSQ according to the sample 12 has a thickness of 0.3 μm and was formed by spin coating. The barrier film of SiOC according to the sample 13 has a thickness of 0.3 μm and was formed by PE-CVD. Electrons were injected into the prepared samples 12 to 14. The contact angle of a surface of the sample 12 (surface of the barrier film of MSQ) before electron injection was 92°, while the contact angle of the surface of the sample 12 after electron injection was 45°. The contact angle of a surface of the sample 14 (surface of the electret film of $SiO_2$) before electron injection was 39°, while the contact angle of the surface of the sample 14 after electron injection was 31°. The contact angles of a surface of the sample 13 (surface of the barrier film of SiOC) were similar to those of the sample 12. The surface potentials of the samples 12 to 14 were measured. Results thereof are shown in FIG. 9.

Figure 9:
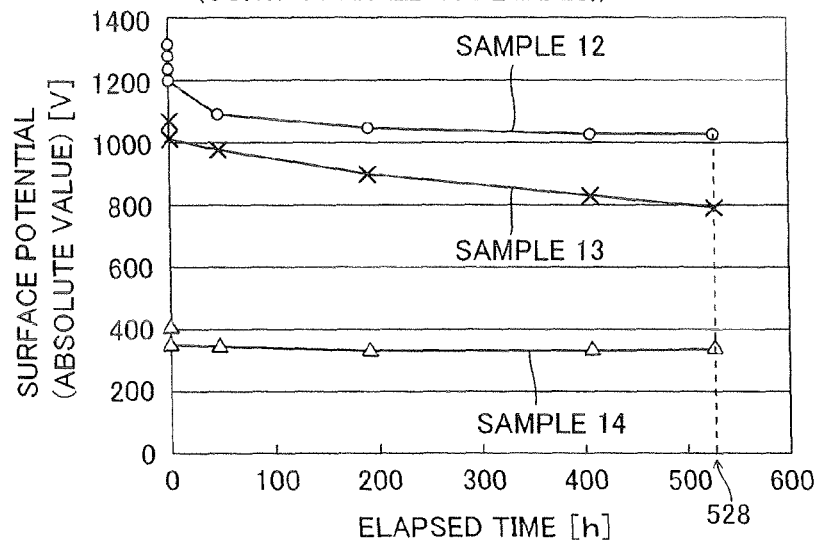
FIG. 9 is a graph showing the relation between surface potentials and elapsed time in samples 12 to 14.

From the measurement results shown in FIG. 9, after a lapse of 528 hours (22 days), the surface potential of the electret device according to the sample 12 corresponding to the aforementioned second embodiment, constituted by forming the barrier film of MSQ on the surfaces of the electret films of $SiO_2$ was about −1020 V. After a lapse of 528 hours (22 days), the surface potential of the electret device according to the sample 13 corresponding to the aforementioned second embodiment, constituted by forming the barrier film of SiOC on the surfaces of the electret films of $SiO_2$ was about −811 V. After a lapse of 528 hours (22 days), the surface potential of the sample 14 according to the comparative example, constituted by the electret film of $SiO_2$ was about −330 V.

It has been proved from the aforementioned measurement results that the surface potential of the electret device is increased by forming the barrier film on the surfaces of the electret films as in the samples 12 and 13. This is conceivably because the barrier film having lower wettability as compared with the surfaces of the electret films can inhibit the electret films and moisture in the atmosphere from being in contact with each other and hence electrons injected in the electret films can be inhibited from leakage.

Third Embodiment

Figure 10:
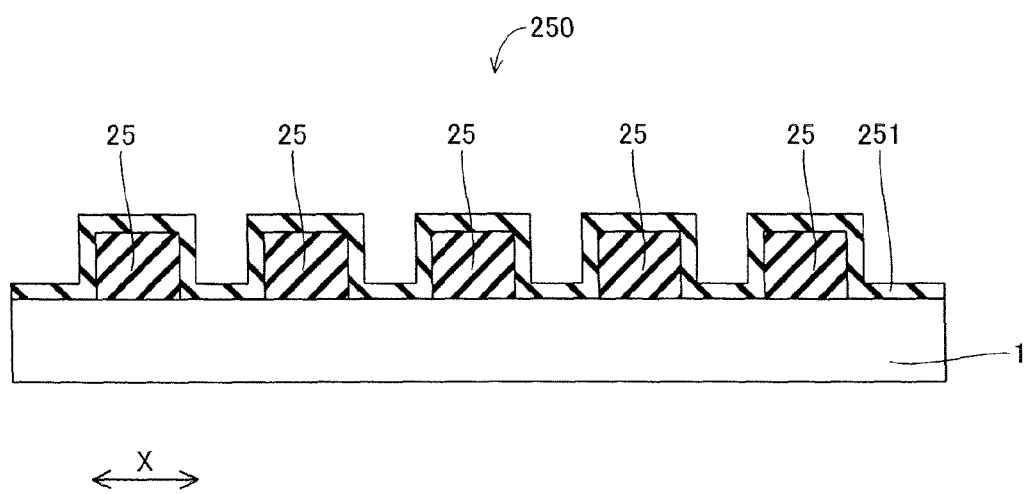
FIG. 10 is a sectional view showing a structure of an electret device according to a third embodiment of the present invention.

Referring to FIG. 10, in an electret device according to a third embodiment, electret films consisting of TEOS (tetraethyl orthosilicate) are formed by plasma CVD dissimilarly to the electret devices according to the first and second embodiments where the electret films are formed by thermal oxidation.

As shown in FIG. 10, in an electret device 250 according to a third embodiment, electret films 25 (TEOS film) are formed on a surface of the silicon substrate 1 by plasma CVD and thereafter MSQ films are formed on the electret films 25 by spin coating. Then charges are injected into the electret films 25 by corona discharge, thereby forming the electret device 250.

According to the third embodiment, as hereinabove described, a barrier film 251 of MSQ can inhibit the electret films 25 and moisture in the atmosphere from being in contact with each other also when the electret films 25 (TEOS films) are formed by plasma CVD. Thus, electrons stored in the electret films 25 can be inhibited from leaking into moisture in the atmosphere, and hence the electrons stored in the electret films 25 can be inhibited from reduction. Therefore, the surface potential of the electret device 250 can be inhibited from reduction.

The remaining structure and effects of the third embodiment are similar to those of the aforementioned first and second embodiments.

An experiment conducted for confirming the aforementioned effect of the barrier film according to the third embodiment will be now described. In this experiment, the following samples 15 to 16 were prepared. More specifically, an electret device according to the sample 15 corresponding to the aforementioned third embodiment, constituted by forming a barrier film of MSQ on surfaces of electret films of TEOS, and the sample 16 according to a comparative example, constituted by electret film of TEOS with no barrier film formed thereon.

Figures 11, 12:
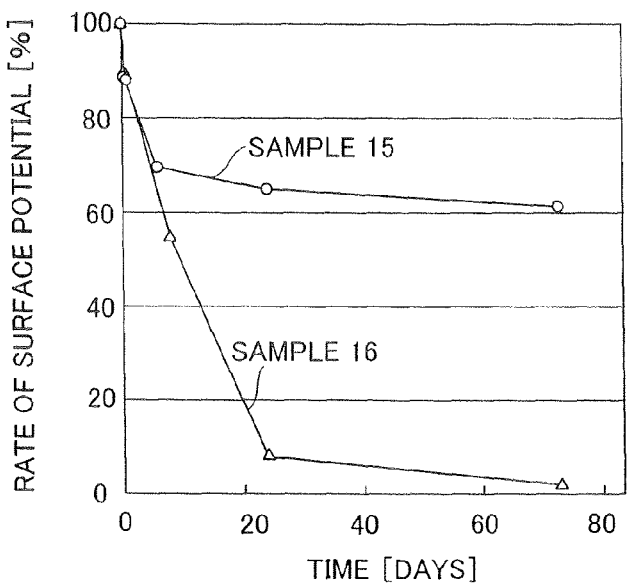
FIG. 11 is a graph showing the relation between the rates of surface potentials and elapsed time in samples 15 and 16.
FIG. 12 is a table showing the relation between the rates of surface potentials and elapsed time in samples 15 and 16.

First, variation with time of the surface potentials after charge injection was measured. Results thereof are shown in FIGS. 11 and 12. The electret device is held at a temperature of about 25° C. and relative humidity of about 35%.

From the measurement results shown in FIGS. 11 and 12, as to the sample 15 corresponding to the third embodiment, the rate of the surface potential after a lapse of 72 hours after charge injection with respect to the surface potential immediately after charge injection is about 61%. As to the sample 16 according to the comparative example, on the other hand, the rate of the surface potential after a lapse of 72 hours after charge injection with respect to the surface potential immediately after charge injection is reduced to about 2%. Thus, it has been proved that the surface potential of each electret film can be inhibited from reduction also when the barrier film is formed on the electret film (TEOS film) formed by CVD.

Figures 13, 14:
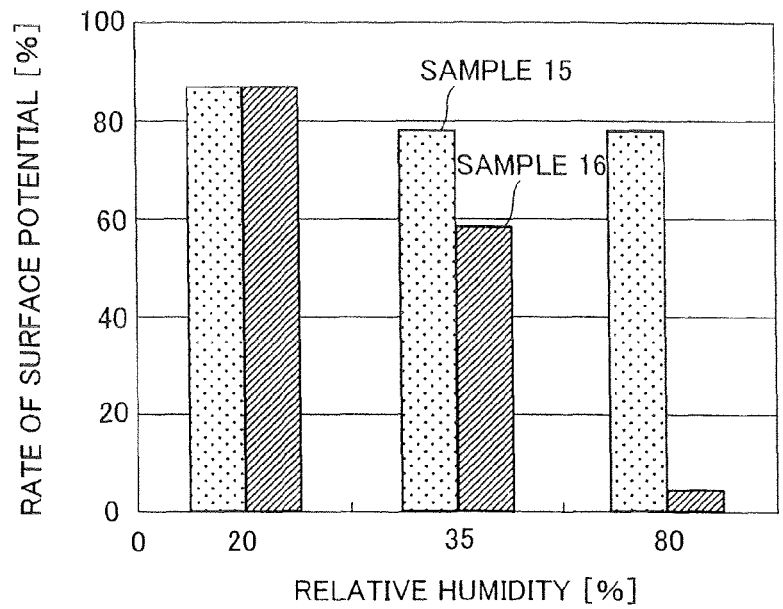
FIG. 13 is a graph showing the relation between the rates of surface potentials and relative humidity in samples 15 and 16.
FIG. 14 is a table showing the relation between the rates of surface potentials and relative humidity in samples 15 and 16.

The rates of change in the surface potentials of the samples 15 and 16 in the case of changing humidity in holding the electret devices into which charges were injected were measured. More specifically, the measurement was performed under conditions of relative humidity of about 10%, about 35% and about 80%. Results thereof are shown in FIGS. 13 and 14. The electret devices are held at a room temperature of about 25° C. for about 6 hours.

As shown in the measurement results of FIGS. 13 and 14, the rates of the surface potentials of the samples 15 and 16 with respect to the surface potentials immediately after charge injection is about 86% under a condition of relative humidity of about 10% Under a condition of relative humidity of about 80%, on the other hand, the rates of the surface potential of the sample 15 corresponding to the third embodiment with respect to the surface potential immediately after charge injection is about 79%, while the rates of the surface potential of the sample 16 according to the comparative example with respect to the surface potential immediately after charge injection is reduced to about 4%. This is conceivably because the barrier film consisting of MSQ reliably inhibits penetration of moisture in the atmosphere into the electret films causing outflow of charges stored in the electret films. From these results, therefore, it can be said that moisture resistance of the electret device is improved by providing the barrier film of MSQ on the electret films. In other words, the surface potential can be inhibited from reduction also under a condition of high humidity.

Fourth Embodiment

A structure of an electrostatic induction generator 300 according to a fourth embodiment will be described with reference to FIG. 15. The fourth embodiment of the present invention is applied to the electrostatic induction generator 300, which is an exemplary electrostatic induction conversion apparatus.

Figure 15:
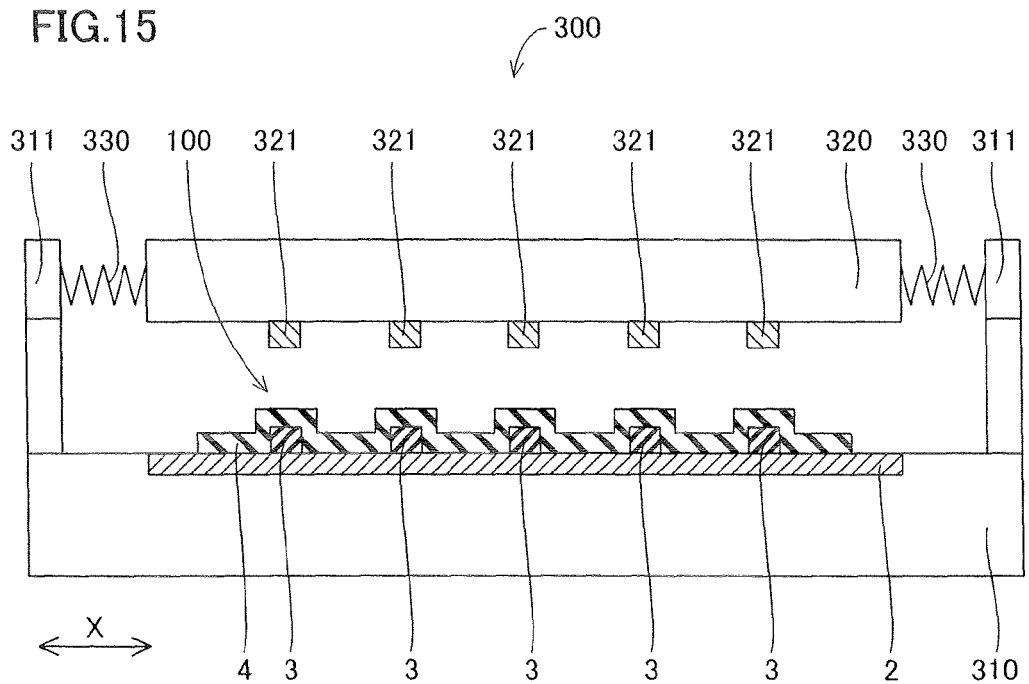
FIG. 15 is a sectional view showing a structure of an electrostatic induction generator according to a fourth embodiment of the present invention.

The electrostatic induction generator 300 according to the fourth embodiment comprises a fixed portion 310, a movable portion 320 and springs 330 as shown in FIG. 15. The fixed portion 310 is constituted by a silicon substrate. An electrode 2, electret films 3 and a barrier film 4 according to the first embodiment are formed on a surface of the fixed portion 310. In other words, an electret device 100 according to the first embodiment is formed on the surface of the fixed portion 310. Support portions 311 are formed on both ends in a direction X of the fixed portion 310. These support portions 311 are provided with springs 330.

Both ends in the direction X of the movable portion 320 are supported by the springs 330. Thus, the movable portion 320 is movably provided in the direction X with respect to the fixed portion 310. The movable portion 320 are provided at prescribed interval from the surface of the fixed portion 310. A plurality of movable electrodes 321 are formed on a surface closer to the fixed portion 310 of the movable portion 320 at prescribed intervals in the direction X. The movable electrodes 321 are so formed as to be opposed to the electret films 3.

A power generating operation of the electrostatic induction generator 300 according to the fourth embodiment of the present invention will be now descried with reference to FIG. 15.

First, as shown in FIG. 15, the electret films 3 and the movable electrodes 321 are arranged to be opposed to each other, and hence positive charges are induced in the movable electrodes 321 with the electret films 3.

The electrostatic induction generator 300 moves in the direction X, whereby the movable electrodes 321 vibrate along with the movable portion 320 in the direction X. When the movable electrodes 321 move to positions where the movable electrodes 321 are not opposed to the electret films 3, a distance between the electret films 3 and the movable electrodes 321 is increased, and hence the quantity of positive charges induced in the movable electrodes 321 with the electret films 3 is reduced.

Thereafter when the movable electrodes 321 move to positions where the movable electrodes 321 are opposed to the electret films 3, the quantity of positive charges induced in the movable electrodes 321 with the electret films 3 is increased. The changed positive charges become current to be outputted. The movable electrodes 321 repeat the aforementioned operation, thereby continuously generating power.

According to the fourth embodiment, as hereinabove described, the electret device 100 is provided, whereby the surface potential of the electret device 100 can be inhibited from reduction and hence the quantity of power generation of the electrostatic induction generator 300 can be inhibited from reduction.

Although the present invention has been described and illustrated in detail, it is clearly understood that the same is by way of illustration and example only and is not to be taken by way of limitation, the spirit and scope of the present invention being limited only by the terms of the appended claims.

For example, while the electret films 3 of $SiO_2$ are employed in each of the aforementioned first to fourth embodiments, the present invention is not restricted to this but electret films consisting of other material such as SiN may alternatively be employed.

While the electret films 3 of $SiO_2$ are formed by thermal oxidation in each of the aforementioned first, second and fourth embodiments, the present invention is not restricted to this but the electret films may alternatively be formed by PMMA (polymethylmethacrylate), PVC (polyvinyl chloride), or polycarbonate, for example These materials are organic materials, soft and work easily and therefore can be formed in the form of a film, thereby allowing mass production.

While the electret films 3 of $SiO_2$ are formed by thermal oxidation in each of the aforementioned first, second and fourth embodiments, the present invention is not restricted to this but the electret films may alternatively be formed by PE (polyethylene), PS (polystyrene), PP (polypropylene) or PET (polyethylene terephthalate), for example. These materials are nonpolar materials and have high hydrophobicity, whereby the surface potential can be inhibited from being reduced due to water.

While the electret films 3 of $SiO_2$ are formed by thermal oxidation in each of the aforementioned first, second and fourth embodiments, the present invention is not restricted to this but the electret films may alternatively be formed by PTFE (polytetrafluoroethylene), PFA (copolymer of tetrafluoroethylene and perfluoro alkylvinyl ether), FEP (copolymer of tetrafluoroethylene and hexafluoropropylene), ETFE (copolymer of tetrafluoroethylene and ethylene), PVDF (polyvinylidene-fluoride), PCTFE (polychlorotrifluoroethylene), PVF (Poly vinyl fluoride), FEP-Teflon (copolymer of tetrafluoroethylene and hexapropylen), BVE (4-vinyloxy-1-butene) copolymer. These materials contain fluorine, can be easily shaped, and have a middle melting point among organic materials while having high heat resistance. Thus, the materials can be used under a wide range of environment.

While the electret films 3 of $SiO_2$ are formed by thermal oxidation in each of the aforementioned first, second and fourth embodiments, the present invention is not restricted to this but the electret films may alternatively be formed by $MgTiO_3$ (Magnesium Titanate), $BaTiO_3$ (barium titanate), $CaTiO_3$ (calcium titanate), $Al_2O_3$ (aluminum oxide), for example. These materials are inorganic materials, have a melting point exceeding about 1000° C. and high heat resistance as compared with organic materials, and have high hardness. Therefore, a movable member can be prepared with high precision when forming the movable member in a vibrating structure by these materials.

While the electret films 3 of $SiO_2$ are formed by thermal oxidation in each of the aforementioned first and second embodiments, the present invention is not restricted to this but the electret films may alternatively be formed by $Si_3N_4$ (silicon nitride) for example.

While the barrier film of MSQ is formed on the TEOS film in the aforementioned third embodiment, the present invention is not restricted to this but a barrier film of SiOC may alternatively be formed.

While the barrier film of MSQ or SiOC is formed in each of the aforementioned first to fourth embodiments, the present invention is not restricted to this but a barrier film of fluororesin (CF) may alternatively be formed.

While the MSQ (methyl silses quioxane) film is formed by spin coating as the barrier film in each of the aforementioned first to fourth embodiments, the present invention is not restricted to this but the barrier film may alternatively be formed by a polyimide film (organic polymer), for example. The materials are formed on the electret films by a method of application such as spin coating, and a wide range of cover films can be formed as compared with a case of employing CVD restricted by chemical reaction pathway or reaction temperature.

While the SiOC film is formed by CVD as the barrier film in each of the aforementioned first, second and fourth embodiments, the present invention is not restricted to this but the barrier film may alternatively be formed by a CF film, a Teflon film, a parylene film or the like. These materials are formed on the electret films by CVD, and film deposition proceeds together with a sputtering phenomenon, thereby being applicable for formation of a fine groove between wires.

While the electrode 2 is formed by being doped with phosphorus (P) by thermal diffusion in each of the aforementioned first, second and fourth embodiments; the present invention is not restricted to this but the electrode may alternatively be formed by gold (Au) or aluminum (Al).

While trimethylsilane and $O_2$ are employed as source gas when forming the barrier film 4 of SiOC in each of the aforementioned first, second and fourth embodiments, the present invention is not restricted to this but other organic silane gas and $N_2O$ or $O_2$ may alternatively be employed as organic gas when forming the barrier film 4 of SiOC. The other organic silane gas includes Monomethylsilane ($SiH_3CH_3$), di-methyl silane (($CH_3)_2SiH_2$) or the like.

While the electrostatic induction generator 300 as an exemplary electrostatic induction conversion apparatus is shown in the aforementioned fourth embodiment, the present invention is not restricted to this but the present invention is also applicable to other electrostatic induction conversion apparatus such as an actuator of an electrostatic induction type so far as the electrostatic induction conversion apparatus includes the electret device.

While the electret device 100 according to the first embodiment is formed on the fixed portion 310 in the aforementioned fourth embodiment, the present invention is not restricted to this but the electret device 200 according to the second embodiment or the electret device 250 according to the third embodiment may alternatively be formed on the fixed portion 310.

While the electret films 3 are formed on the fixed portion 310 and the movable electrodes 321 are formed on the movable portion 320 in the aforementioned fourth embodiment, the present invention is not restricted to this but the fixed electrode may alternatively be formed on the fixed portion and the electret film may alternatively be formed on the movable portion.

What is claimed is:

1. An electret device comprising:
   a substrate;
   a single electrode formed on said substrate;
   a plurality of electret films into which charges are injected and formed on a surface of said single electrode at prescribed intervals, so as to be commonly connected by said single electrode; and
   a barrier film provided on a surface of said plurality of electret films and having an electron affinity smaller than the electron affinity of said plurality of electret films, the barrier film forming an energy barrier between said plurality of the electret films and the atmosphere by a difference between the electron affinity of said plurality of the electret films and the electron affinity of the barrier film.

2. The electret device according to claim 1, wherein said barrier film contains either MSQ or SiOC.

3. The electret device according to claim 1, wherein said barrier film contains an organic component.

4. The electret device according to claim 3, wherein said organic component of said barrier film contains a methyl group having hydrophobicity.

5. The electret device according to claim 1, wherein an impurity is added to said electret film.

6. The electret device according to claim 5, wherein said impurity contains at least either phosphorus or boron.

7. An electrostatic induction conversion apparatus comprising an electret device including:
   a substrate;
   a single electrode formed on said substrate;
   a plurality of electret films into which charges are injected and formed on a surface of said single electrode at prescribed intervals, so as to be commonly connected by said single electrode; and
   a barrier film provided on a surface of said plurality of electret films and having an electron affinity smaller than the electron affinity of said plurality of electret films, the barrier film forming an energy barrier between said plurality of the electret films and the atmosphere by a difference between the electron affinity of said plurality of electret films and the electron affinity of the barrier film.

8. The electrostatic induction conversion apparatus according to claim 7, wherein said barrier film contains either MSQ or SiOC.

9. The electrostatic induction conversion apparatus according to claim 7, wherein said barrier film contains an organic component having hydrophobicity.

10. The electrostatic induction conversion apparatus according to claim 7, wherein an impurity is added to said electret film.

11. The electrostatic induction conversion apparatus according to claim 7, wherein said impurity contains at least either phosphorus or boron.

12. The electrostatic induction conversion apparatus according to claim 7, wherein said electrostatic induction conversion apparatus is a generator.

* * * * *